(12) United States Patent
Fava

(10) Patent No.: US 8,651,851 B2
(45) Date of Patent: Feb. 18, 2014

(54) MOULD FOR FORMING MEAT AND IN WHICH MEAT CAN BE COOKED

(75) Inventor: Antonio Fava, Parma (IT)

(73) Assignee: Fava S.N.C. di Adele Turetta & C., Parma (IT)

( * ) Notice: Subject to any disclaimer, the term of this patent is extended or adjusted under 35 U.S.C. 154(b) by 276 days.

(21) Appl. No.: 13/254,158

(22) PCT Filed: Feb. 19, 2010

(86) PCT No.: PCT/EP2010/052126
§ 371 (c)(1),
(2), (4) Date: Nov. 7, 2011

(87) PCT Pub. No.: WO2010/100042
PCT Pub. Date: Sep. 10, 2010

(65) Prior Publication Data
US 2012/0064185 A1    Mar. 15, 2012

(30) Foreign Application Priority Data
Mar. 2, 2009    (IT) .............................. RE2009A0018

(51) Int. Cl.
*A22C 7/00*    (2006.01)
(52) U.S. Cl.
USPC ............. 425/410; 425/193; 425/161; 99/439

(58) Field of Classification Search
CPC ... A22C 7/0046; A22C 7/0053; A22C 7/0061
USPC ..................... 99/439; 425/410, 193
See application file for complete search history.

(56) References Cited

U.S. PATENT DOCUMENTS

| 1,540,186 A | 6/1925 | Rispel et al. |
| 2,310,956 A | 2/1943 | Hoy |
| 5,520,097 A | 5/1996 | Cody et al. |

FOREIGN PATENT DOCUMENTS

| EP | 0067800 A2 | 12/1982 |
| EP | 0589098 A1 | 3/1994 |

*Primary Examiner* — Yogendra Gupta
*Assistant Examiner* — Alison Hindenlang
(74) *Attorney, Agent, or Firm* — Volpe and Koenig PC

(57) ABSTRACT

A mould for forming meat, comprising a bottom die formed as a recipient, a concavity of which faces in an upwards direction and is configured to contain the meat, a cover for closing and sliding internally of the mouth of the concavity, and elastic pusher that pushes the cover in order to compress the meat contained in the concavity of the bottom die; the elastic pusher being located externally of and by a side of the bottom die, and being singly interposed between an opposing element fixed to the bottom die and a vertically-mobile hook element fixed to the bottom die, which hook element is configured to hook the cover in order to create a constraint preventing the cover from separating from the hook element in an upwards vertical direction.

14 Claims, 13 Drawing Sheets

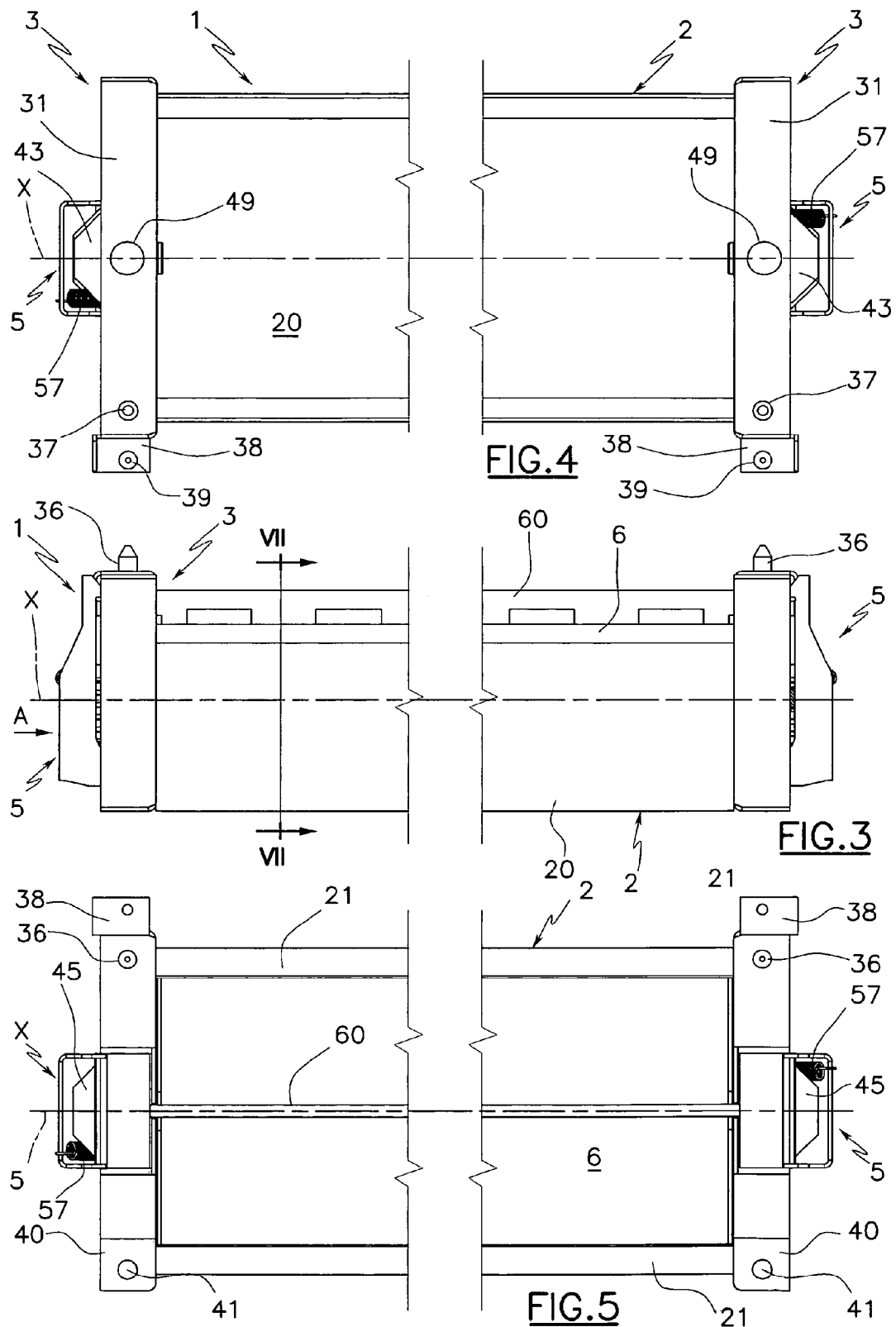

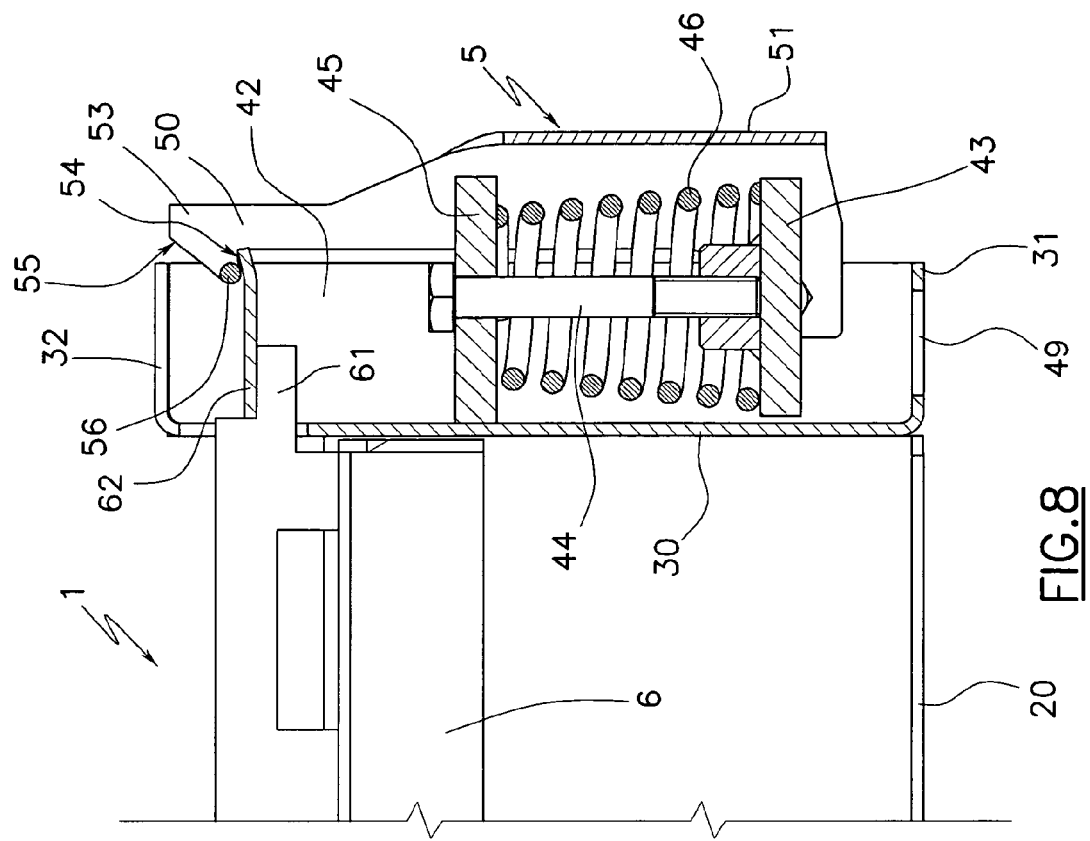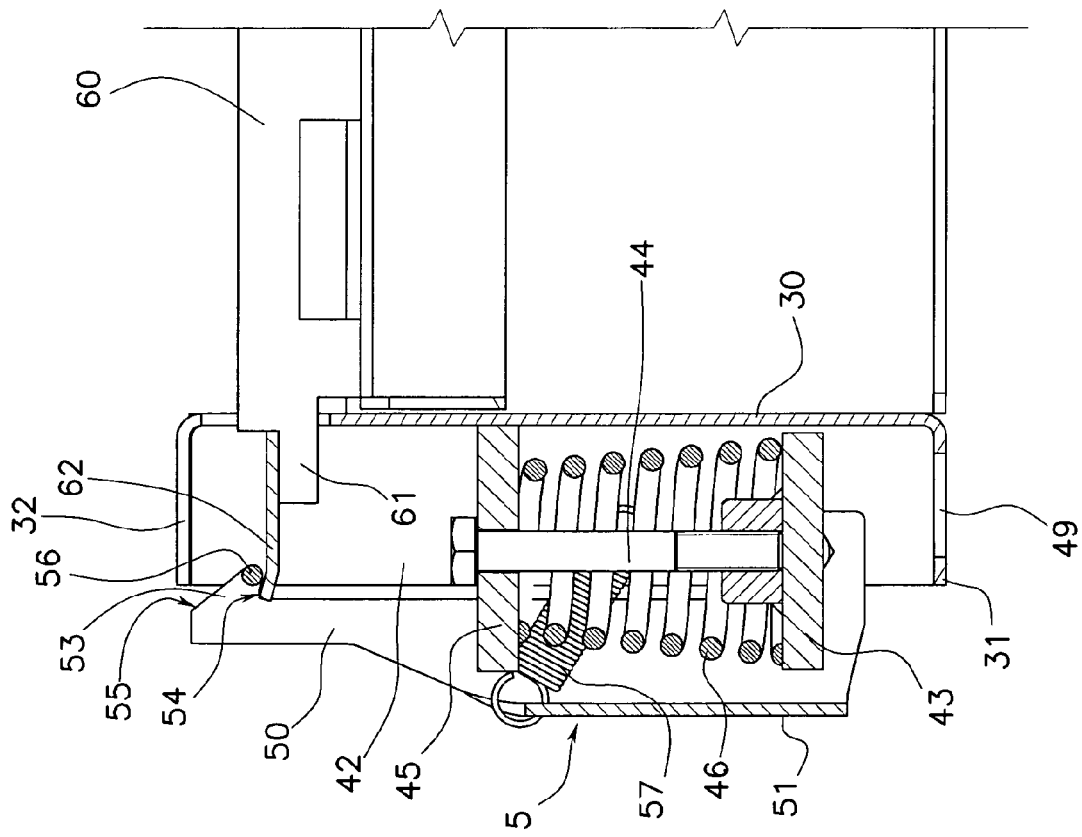
FIG.8

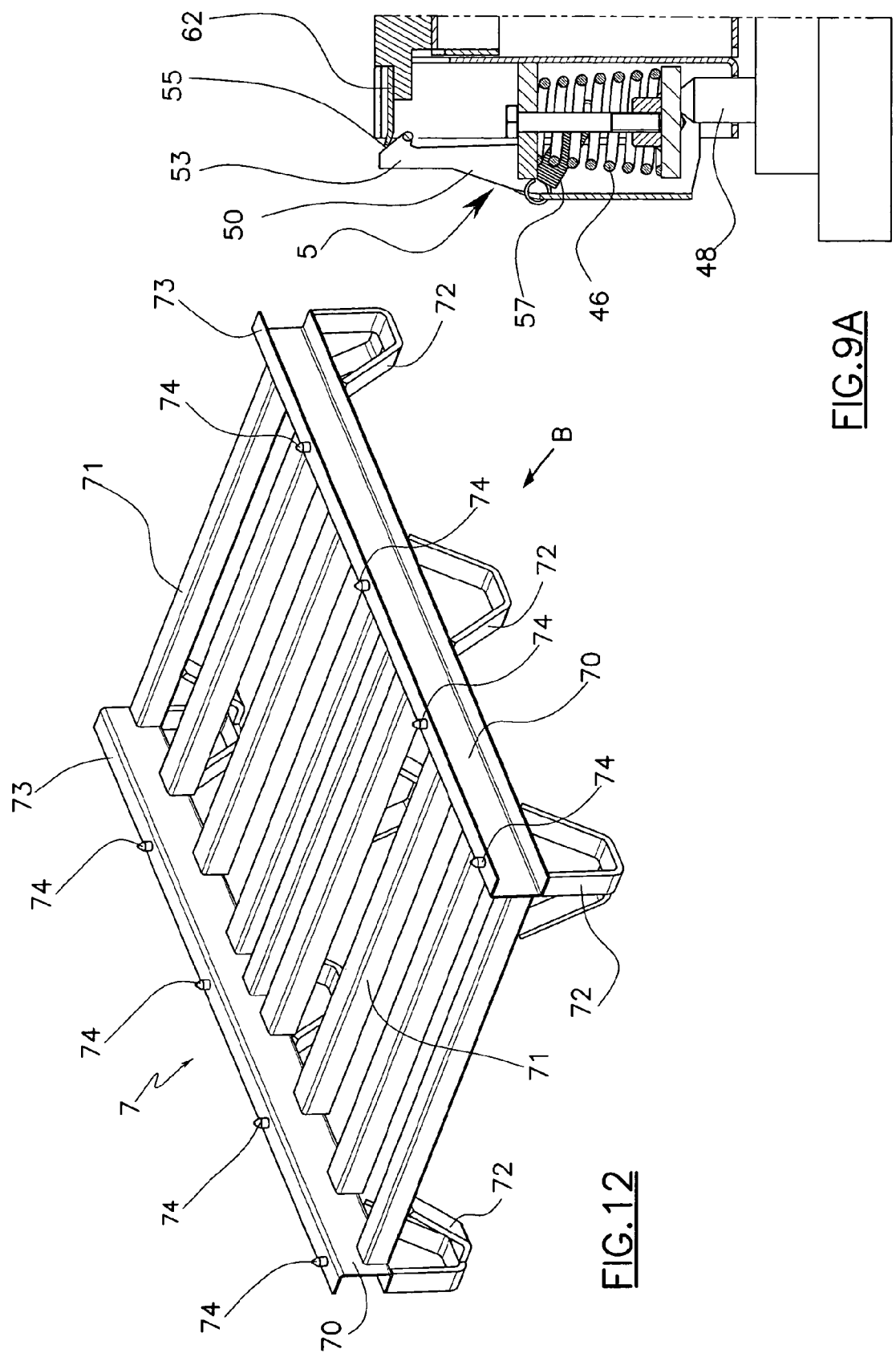

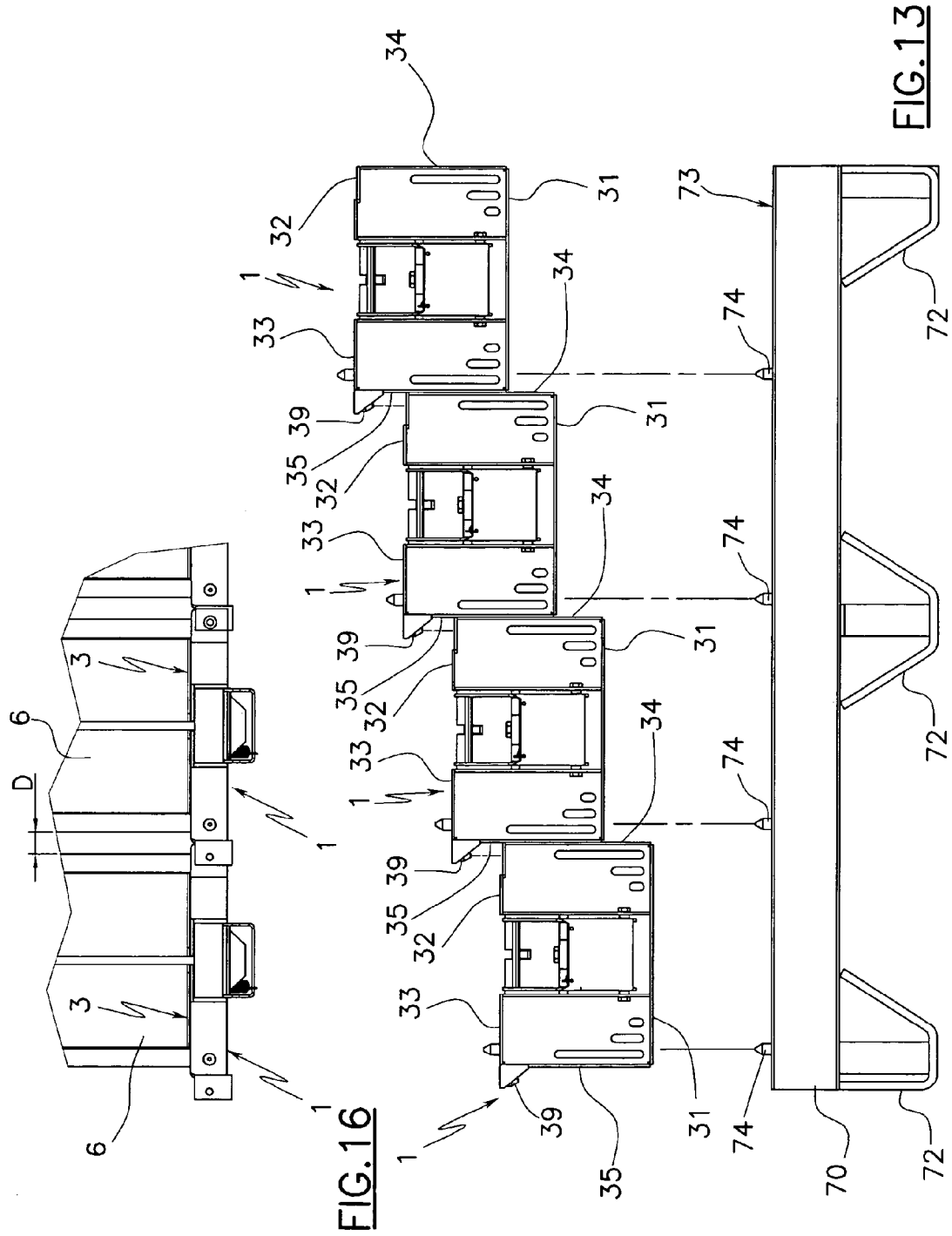

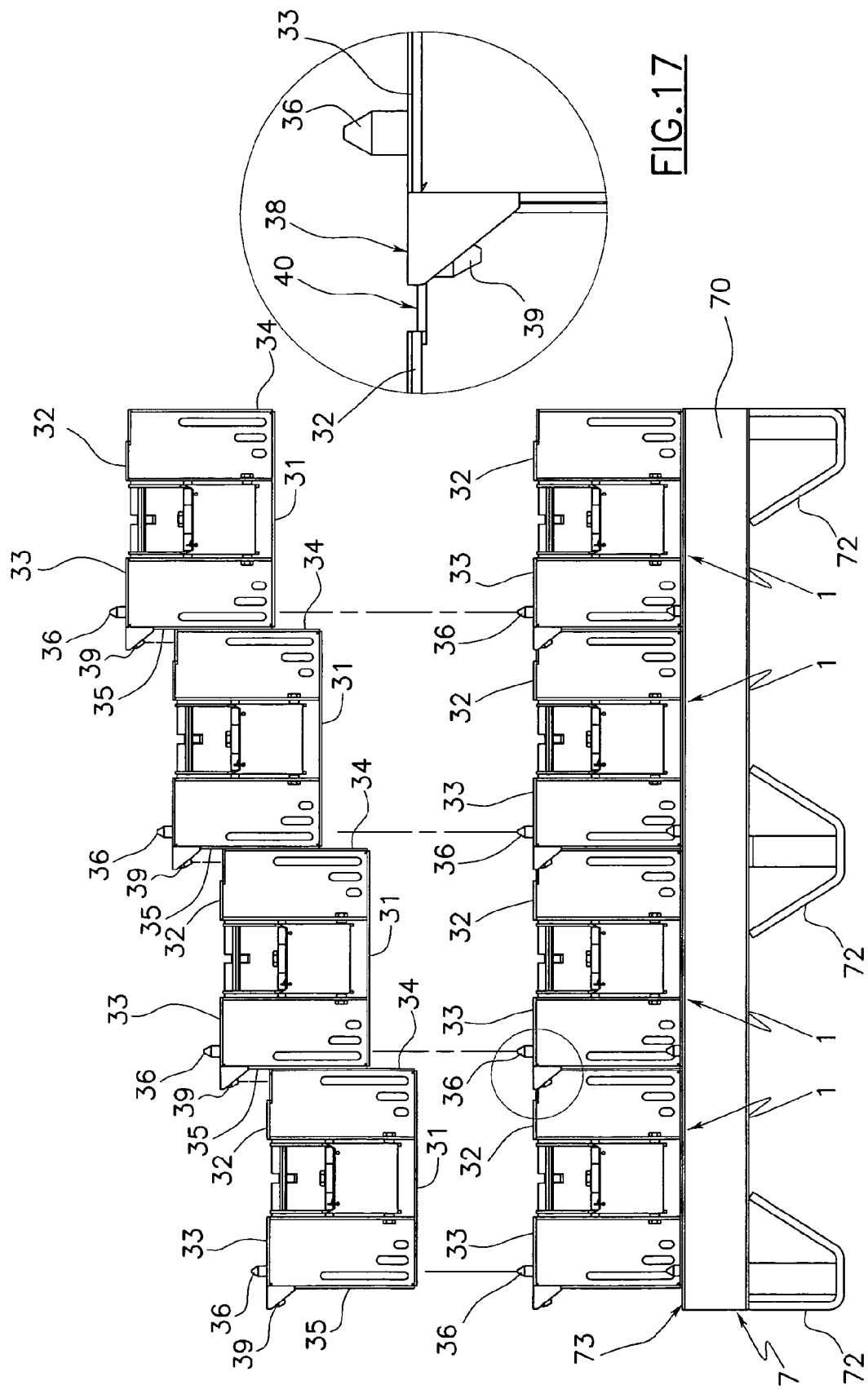

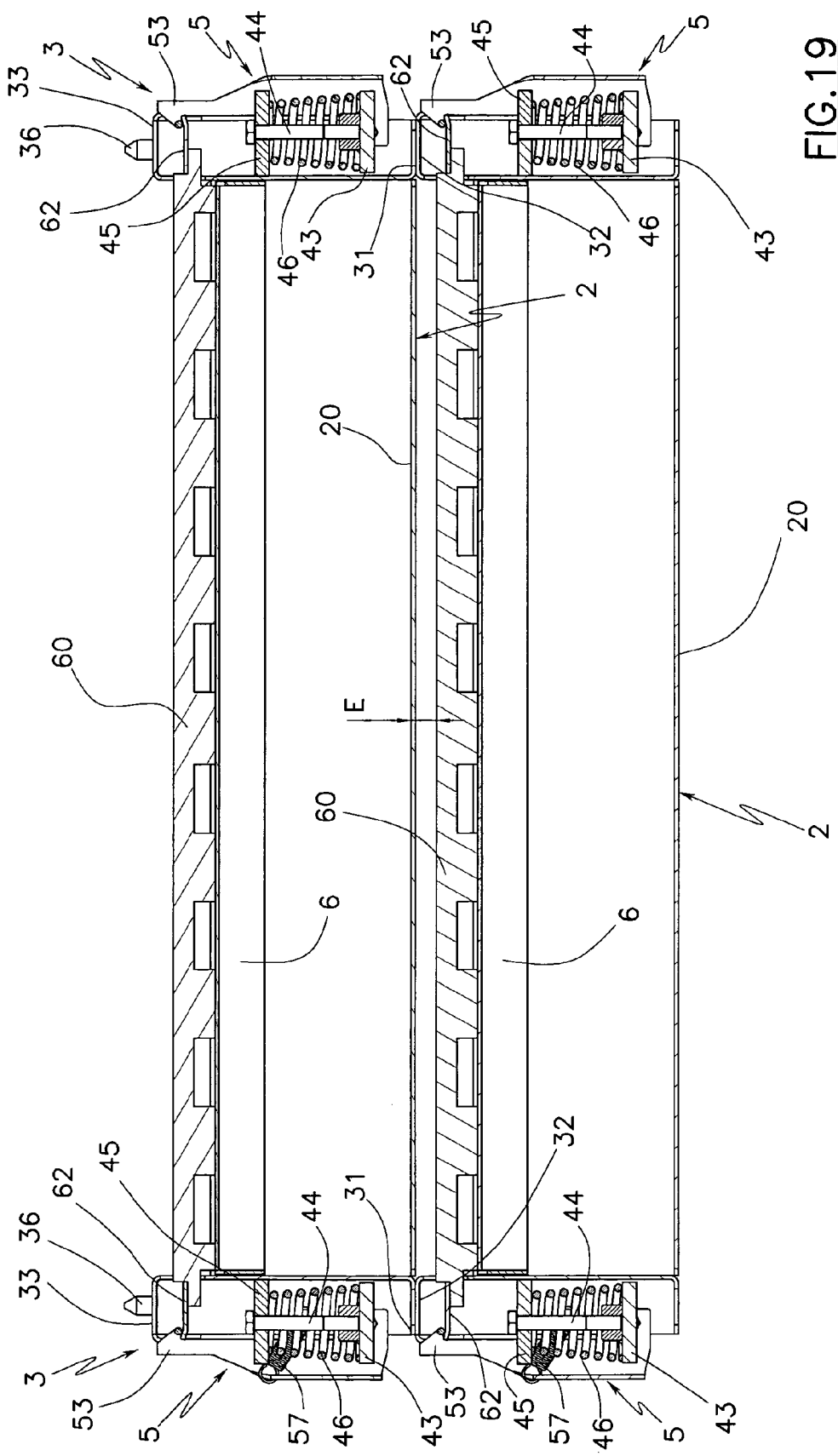

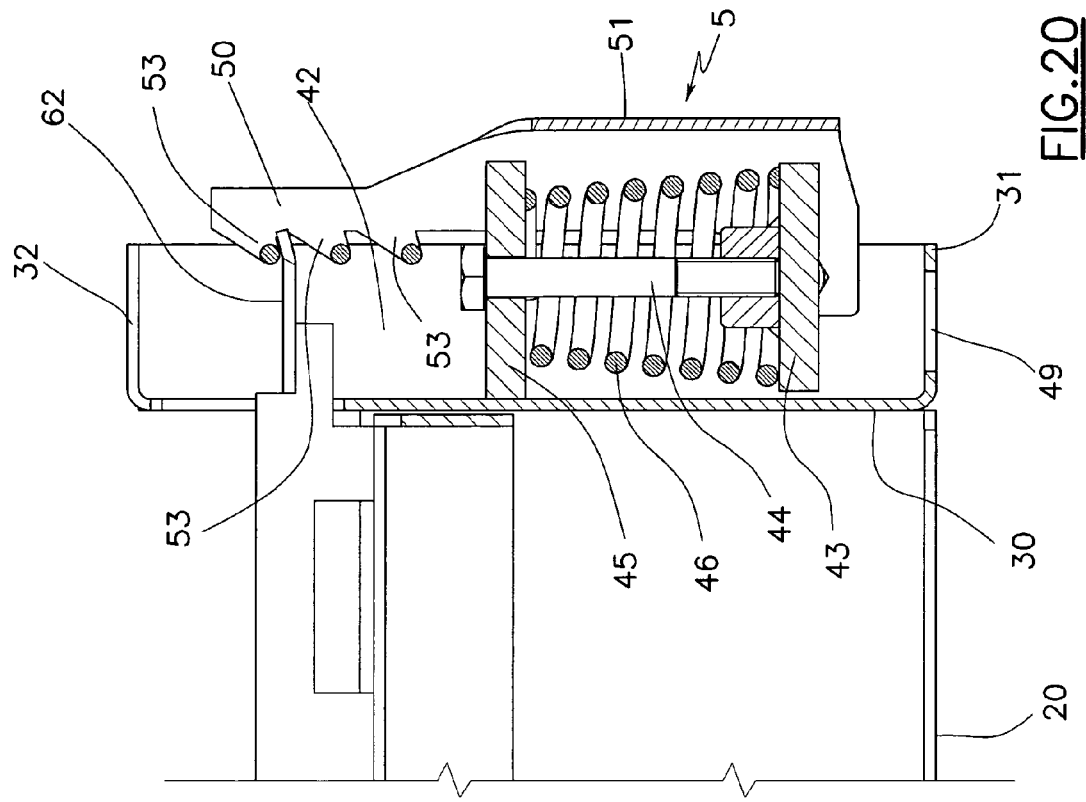
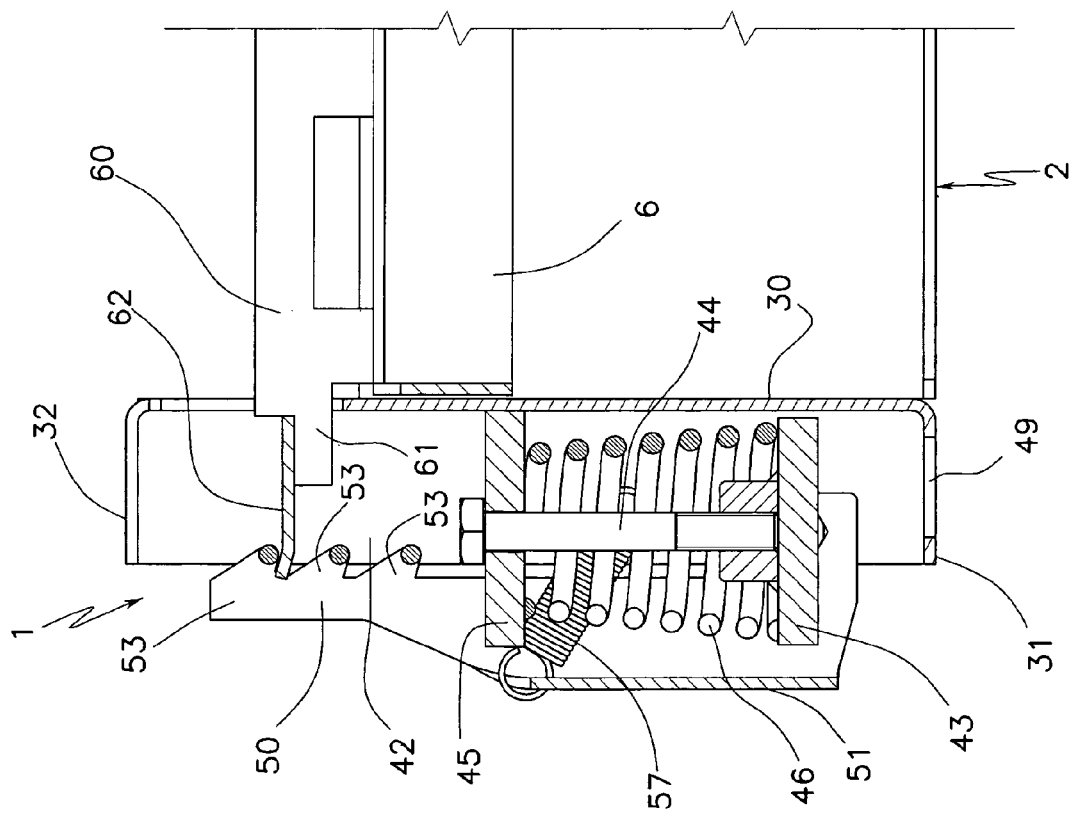
FIG. 20

MOULD FOR FORMING MEAT AND IN WHICH MEAT CAN BE COOKED

The invention relates to moulds for forming and if so required for cooking meat, in particular pork-meats such as Parma ham, cooked ham and like products.

The production of hams (and like products) in loaf shapes, whole or transversally fractioned, provides considerable advantages for the sold and sliced product as it notably increases the performance of the slicing and packing lines, as well as reducing waste at the ends of the loaves.

Various technologies are known for the production of loaves of cooked ham or other cooked products.

According to the most tried and tested technology, semi-worked products destined for production of loaves are cooked in waterproof casings where the product is not in contact with the air (termed "vacuum cooking") in order to improve the compactness and single-body-effect of the product.

This technology includes the introduction of ham or shoulder (but can be applied to white meats and in any case to meats in general) in waterproof packs which are housed in moulds which impress on them a particular shape which during cooking thereof will become stable.

The waterproof packs are advantageously, though not exclusively, constituted by bags made of a flexible and heat-weldable plastic material, which are filled with the product (meat, possibly treated by injection of saline solutions and massaged by suitable machines), and are then vacuum-sealed such as to hermetically insulate the meat placed in the bag from the outside environment.

The introduction of the meat into the bags can be done in various ways.

A first of these modalities comprises housing the empty bags directly in the moulds, introducing the meat and finally heat-welding the bags under vacuum by special machines (vacuum heat-welders).

A second of the modalities includes housing the empty bags, or pre-formed bags, internally of containers ("false moulds"), introducing the meat, heat-welding the bags (or pre-formed bags) under vacuum using special machines (heat-formers and/or capsule fillers, according to the specific case) and finally transferring the thus-prepared products internally of the moulds.

A third modality involves the use of vacuum-bagging machines for inserting the meat in "tubes" of flexible plastic material, which are then closed at ends thereof by stapling machines, forming closed bags which are then transferred internally of the moulds.

Apart from the technology which uses the impermeable wrappers, a further technology is also known, though less used, in which the semi-finished products destined for the production of the bars are cooked in liquid-, steam- and gas-permeable wrappers.

These permeable wrappers are generally constituted by a sheet of cartene, or the like, which is first housed in the forming moulds and then filled by the product (meat, possibly treated with saline injections and massaged by suitable machines), before being finally wrapped and enveloped about the product, such as to realise a closed wrapping which is interposed between the die and the product.

Independently of the type of wrappers and the methods selected for introducing the meat into the moulds, the present invention relates to the moulds in which the wrappers are housed for forming and possibly cooking the meat.

In general, the moulds can be made in two different forms in alternative embodiments.

The first embodiment includes the use of single moulds comprising:

a bottom die made in the form of a recipient for containing the meat, with a concavity of the recipient facing upwards;

a cover for closing the bottom die and sliding internally of the upper mouth of the concavity;

a contrast element constrained to the bottom die, and elastic pushing means for pushing the cover to compress the meat contained in the bottom die, interposed between the cover and the contrast element (producers of these moulds are: Menozzi, Manzini, Riva and other international producers).

The products are obtained by positioning the bag internally of the bottom die and positioning the product, then closing the bag about the product (possibly by vacuum heat-welding), positioning and pressing the cover, and thus subjecting the product to cooking while contained in the mould.

The muscle bundles resulting from the anatomical sectioning of the animal can be placed in the moulds, which leads to a spatial conditioning of the product in the bottom die, which in this case produces a slice of meat which is similar to a product cooked whole, with better results in terms of performance and firmness of the slice.

The products are differentiated into products either without or with "weight loss", i.e. with a reduction in weight, which occurs because during cooking of the meat a liquid or gelatinous part (the "exudate") separates out.

In the case of vacuum cooking the exudate remains inside the cooking wrapper.

Owing to this phenomenon, an extra part has to be included in the sealed bag, which part is empty at the start and in which the exudate collects during the cooking stage, such that the exudate does not remain internally of the final product.

"Weight loss" relates to products exhibiting, in the cooking bag, a presence of exudate exceeding 3%.

As a general rule, though not to be taken too literally, the greater the weight loss the greater the quality of the final product.

If a case in which the meat is treated in a permeable cartene wrapper, the exudate exits from the mould and finishes on the ground, and thus in the drains; there are, in this case, no limits to the entity of weight loss.

The above-described moulds enable the weight-loss method to be used to the fullest, and can also accept relatively-high weight losses, as they enable the excess part of the bag to be arranged, when present, by a side of and parallel to the product, outside the mould.

Further, the moulds, in both technologies, can be squeezed at the end of cooking, to return the pressing force, reduced by distension of the elastic springs due to the product weight loss, to the level set before cooking.

Though enabling top-quality production to be achieved, these moulds do not allow fullest and rational use of traditional ovens, in which it is industrially necessary to introduce the product in regular and rational stacks, due to the fact that the moulds, because of the conformation thereof, are poorly suited to being stacked satisfactorily.

It is not possible to stack the moulds vertically one on top of another because the weight bearing on the lower moulds varies the pressure with which the meat is compressed by the mould cover, with resulting variations in the product quality, in some cases producing excessive and unacceptable pressures. Additionally the stacked moulds are not sufficiently stable.

A known method for stacking these moulds involves arranging them in a vertical pyramid formation, when each bottom die bears directly on two underlying bottom dies.

This stacking method poses various technical problems, the first being stability. Furthermore, the interspace between the bottom dies is relatively small and does not permit an efficient circulation of cooking steam between the moulds, with resulting poor temperature distribution; nor does this method enable arrangement of the exceeding parts of the bags outside the cavities of the bottom die along the longitudinal flanks of the mould, preventing good weight-loss performance.

In practice, the technology that involves the use of the moulds described above applies different means for handling moulds inside ovens, including transport systems with suspended tray conveyors which, however, require investment in expensive plants in which there is anyway a poor exploitation of the internal volume of the ovens.

In all cases, the risk of puncturing the bags is high, especially in the part thereof which is outside the mould, and the desired technological results are impossible to reach.

Furthermore, "traditional" type moulds are not frequently used for the production of loaves, due amongst other things to handling problems caused by the weight, constructional shape and especially the difficulties of subjection to automated movement.

A second realisation includes, as a rationalisation of the stacking of products undergoing treatment in the cooking ovens, and for obtaining both the above-mentioned loaves of greater length and already-fractioned ones, the use of large trays superposable in columns and each comprising a plurality of mould bottom dies in upper position and an equal plurality of covers, fixed or slidable, located in the lower part of the tray, which close and press the products placed in the bottom dies of the underlying tray (producers of these include Armorinox, Kaufler, Creminox, Roser and others).

In this case, the meat cannot be bagged directly in the trays, so first it is necessary to fill the bags and place them under vacuum conditions using "dummy moulds", either using heat-formers or vacuum baggers and staplers connected thereto, after which the bags filled with meat are collected and transferred internally of the bottom dies of the trays.

This transfer stage leads not only to an inevitable displacement of the meat in the bags, especially in the case of higher quality foods, but is also an excessively laborious task for the operatives, as these are tasks that cannot be performed automatically.

It is also evident that it is not possible, with these moulds, to produce loaves without the use of the technology which involves vacuum packing of the product before cooking.

In some realisations the lower part of the trays includes covers which can slide with respect to the bottom die of the underlying tray.

The sliding is normally used to obtain products with weight loss, but in this case the weight loss is technologically limited by the possibility of collecting exudate which, for constructional reasons, can happen only in the heads of the bottom dies.

It is is obviously impossible to re-press the product after cooking.

The cooking of the products contained in the stacked trays can be done in suitably-modified steam ovens, or can be done by recycling of water in special hollow spaces (a system which is practically limited to products without weight loss), or even by immersion in water-filled baths.

As for the production of loaves of Parma ham or semi-cooked hams, or similar products, single moulds of a suitable length are used, structurally similar to those described herein above for cooked hams (produced by Menozzi, Rivana and others).

There also exist other moulds, constituted by a containing tray and a cover, which are inserted in special trolleys, conformed such as to exert a pressure on the assembly of the moulds introduced therein.

In both cases the products are generally enveloped in cartene sheets, or the like, which are permeable to air and moisture and which prevent adhesion of the product to the container.

In both cases the products are maintained for some days in special environments, subjected to heat cycles with a variable progression according to the products, for a period of about 7 days, up to obtaining a correct weight loss and adhesion between the parts placed therein.

In the first case, the single moulds exhibit the same stacking, mass and movement limitations as previously described for moulds destined for production of cooked hams.

In the second case, the moulds are difficult to manipulate with handlers or automatic systems, and furthermore the trolleys are complex, heavy to move and in some constructions require periodical interventions, during the product treatment cycle, in order to reset the forces acting on the moulds.

A further limit of these trolley systems is the impossibility of setting up as would be necessary a mould-by-mould treatment, bearing in mind that the products placed in the moulds are each different to another.

An aim of the present invention is to realise moulds having the characteristics of traditional moulds having the characteristics of traditional moulds as in the first delineated embodiment, but overcoming the problems of stacking as set out above.

The aims are attained thanks to the characteristics of the invention as reported in independent claim 1. The independent claims delineate preferred and/or particularly advantageous aspects of the invention.

In particular, a mould is provided for forming and if required cooking meat, comprising a bottom die shaped as a recipient a concavity of which faces in an upwards direction and is destined to contain the meat, a cover for closing and sliding internally of the mouth of the concavity, and elastic pushing means for pushing the cover in order to compress the meat contained in the concavity of the bottom die.

In the invention, the elastic pushing means are located externally of and by a side of the bottom die, and are singly interposed between an opposing element fixed to the bottom die and a vertically-mobile hooking element on the bottom die, which is destined to hook the cover in order to create a constraint preventing the cover from separating from the hooking element in an upwards vertical direction.

The presence of the pressing elements of the covers, i.e. the elastic pushing means and the hooking element, in the heads of the bottom die leads to a considerable reduction in vertically-directed masses, and therefore a considerable increase in the quantity of product treatable per square meter and/or cubic meter of productive structure.

A further advantage due to the presence of the pressing elements of the cover in the heads of the bottom die is the consequent constructional simplification of the cover, with simpler and easier movement.

An advantage of the separated management of the bottom die and the cover is the possibility when required to re-press the moulds.

A further advantage of the separate management of the bottom die and the cover, together with the structure of the hook elements, is the possibility to press the product in a way which is more suitable to the varied dimensions of each single product.

A further advantage is that with minimum risks of damage the bag for the exudate can be arranged on a flank of the mould and thus products can be treated with a definite and desired weight-loss in prospect, which is higher than a weight-loss which can be obtained with tray-systems in the production of the loaves. The moulds can therefore be fractioned and also used for products with weight-loss.

A further advantage is that the presence of dummy moulds can be avoided, thus also avoiding operative fatigue, as they no longer have to move the product from the false mould to the cooking mould, thanks to the possibility of using automated and/or slave transport and movement systems, and with a greater quality of the positioning result as the product does not displace from the position set during the filling of the bag.

A further advantage is the possibility of using the bottom dies (filling bottoms) with a very simple construction.

A further advantage is that covers of a very simple construction can be used.

A further advantage is that smaller and less expensive machines can be used for washing the moulds than those required for the above-described tray-moulds and traditional moulds.

The moulds of the invention are further able to be effectively stacked in vertical columns in horizontal rows, thus achieving various technical advantages.

A first advantage is that the moulds can be stacked to rationalise the load during transport by means of trolleys or the like.

A further advantage is that steam-, water- and/or air-recycling channels can be afforded in the stack, thus obtaining a more homogeneous temperature distribution during the cooking, cooling or any other heat-treatment stages. This enables use of traditional ovens, possibly specially-adapted, but enables even cooking by immersion, with the use of suitable stack-moving systems, as well as heat treatment provided for uncooked products or semi-cooked products.

A further advantage is that the loading and unloading for composing and de-stacking the ordered stack can be automated, with less unwieldy systems that are also less expensive and faster than the tray systems.

A further advantage is that the degree of pressure exerted on the product can be made independent of the point occupied by the mould in the stack.

A further advantage is that stable stacks can be obtained without the use of additional reference and securing systems.

A further advantage is the possibility to keep the cover-pressing operations and the stacking operations separate, with an ensuing considerable simplification of the automation; all of which means that the moulds are suitable for use by smaller-sized companies.

A further advantage is the possibility of keeping the product moulding operations separate from the stacking operations, with a considerable simplification of the automation; all of which once more means that the moulds are suitable for use by smaller-sized companies.

Further characteristics and advantages of the invention will emerge from a reading of the following description, provided by way of non-limiting example with the aid of the figures illustrated in the accompanying tables of the drawings.

FIG. 3 is a lateral view of the mould of FIG. 1 in reduced scale;

FIGS. 4 and 5 are perpendicular projections of the view of FIG. 3;

FIG. 8 is section VIII-VIII of FIG. 7;

FIG. 9A is an enlarged detail in a phase between FIG. 9 and FIG. 10;

FIG. 12 is a perspective view of a bench for stacking moulds according to the present invention;

FIGS. 13, 14 and 15 are the view indicated by the arrow B in FIG. 12 which show the bench in three stages during the stacking of the moulds of the present invention;

FIG. 16 is a partial plan view of FIG. 13;

FIG. 17 is an enlarged detail of FIG. 14;

FIG. 19 is section IXX-IXX of FIG. 15;

FIG. 20 is the section of FIG. 8 relating to a mould in an alternative embodiment of the invention.

Figure 1:
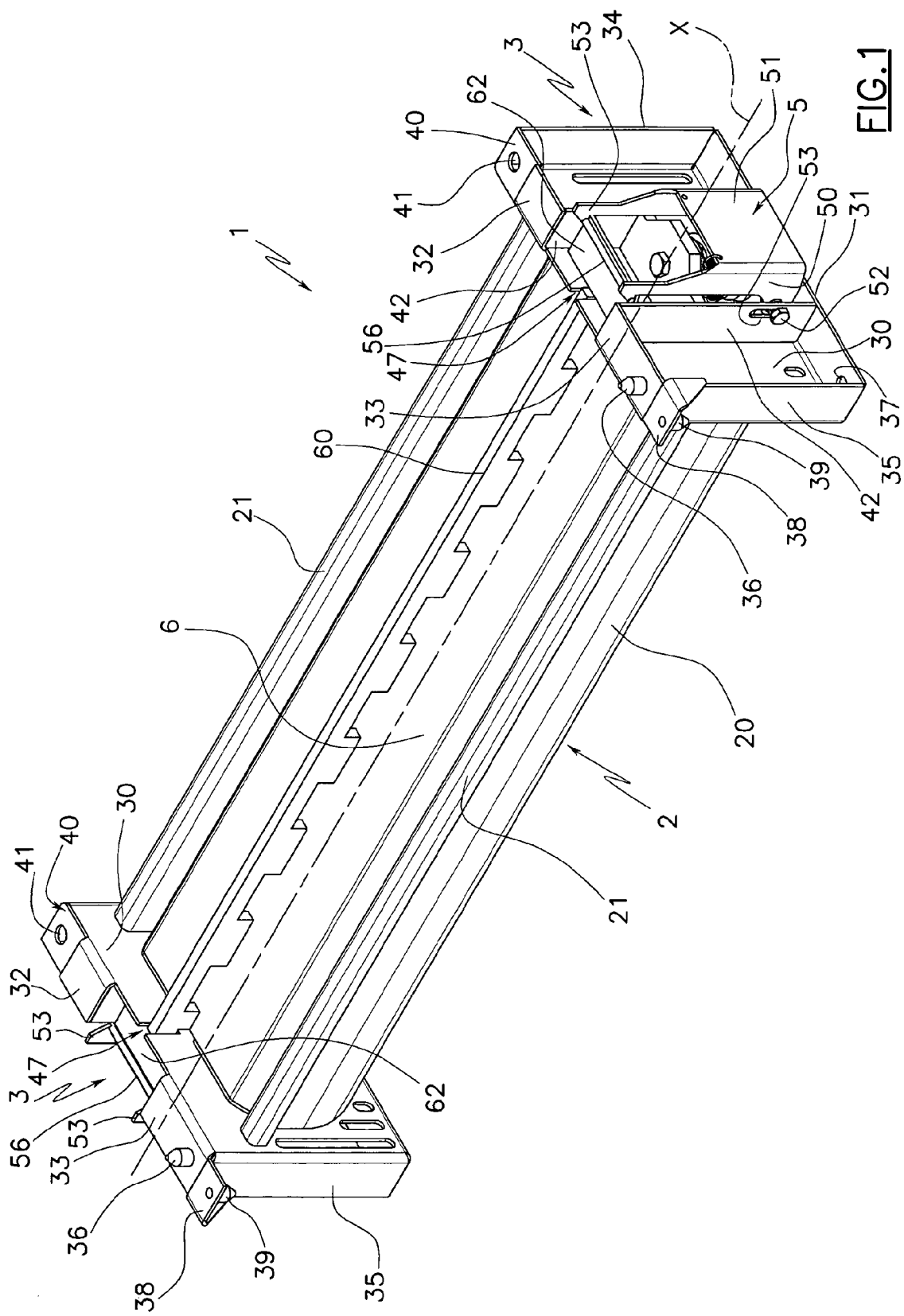
FIG. 1 is a downwards perspective view from above of a mould for forming and cooking, if required, of the present invention.

The mould 1, object of the present invention, comprises a bottom die 2 shaped as a recipient and having a concavity facing in an upwards direction.

The bottom die 2 comprises a stainless steel element 20 which develops longitudinally following a horizontal axis X, with respect to which it exhibits a constant transversal section with a substantially U-shape.

The longitudinal edges 21 of the element 20 are bent externalwise in order to increase the rigidity of the bottom die 2 and such that the surfaces delimiting the mouth of the concavity are as rounded as possible.

The bottom die 2 further comprises two stainless steel heads 3, which are respectively fixed to the front and rear ends of the element 20.

The front head 3 is perfectly symmetrical at the rear head 3, with respect to plane of symmetry which is perpendicular to the longitudinal axis X and passing through the half-way line of the element 20.

Each head 3 comprises a closing plate 30 which is vertically orientated and is destined to close a respective end of the element 20, such as to delimit the recipient defined by the bottom die 2.

The closing plate 30 has a substantially rectangular shape with a larger size than that of the transversal section of the element 20, with respect to which it therefore exhibits a projecting portion.

The projecting portion of the closing plate 30 exhibits a series of lightening slots which facilitate recycling of steam, air, water.

Each closing plate 30 is surrounded by a wall perimeter frame which develop projectingly towards the outside, i.e. on the opposite side with respect to the element 20.

The walls are preferably made by bending, in a single piece with the closing plate 30.

In more detail, a single lower horizontal wall 31 projects from a lower edge of each closing plate 30, which lower horizontal wall 31 extends over a whole width of the closing plate 30, while two coplanar horizontal walls project from the upper edge, respective the right upper edge 32 and the left upper edge 33, which are separated by an empty central space.

Further, two vertical walls, respectively a right vertical wall 34 and a left vertical wall 35, project from two lateral edges of each closing plate 30, which vertical walls 34, 35 develop over a whole height of the closing plate 30, connecting the ends of the lower horizontal wall 31 respectively with the right peripheral end 32 and the left peripheral end 33.

Figure 6:
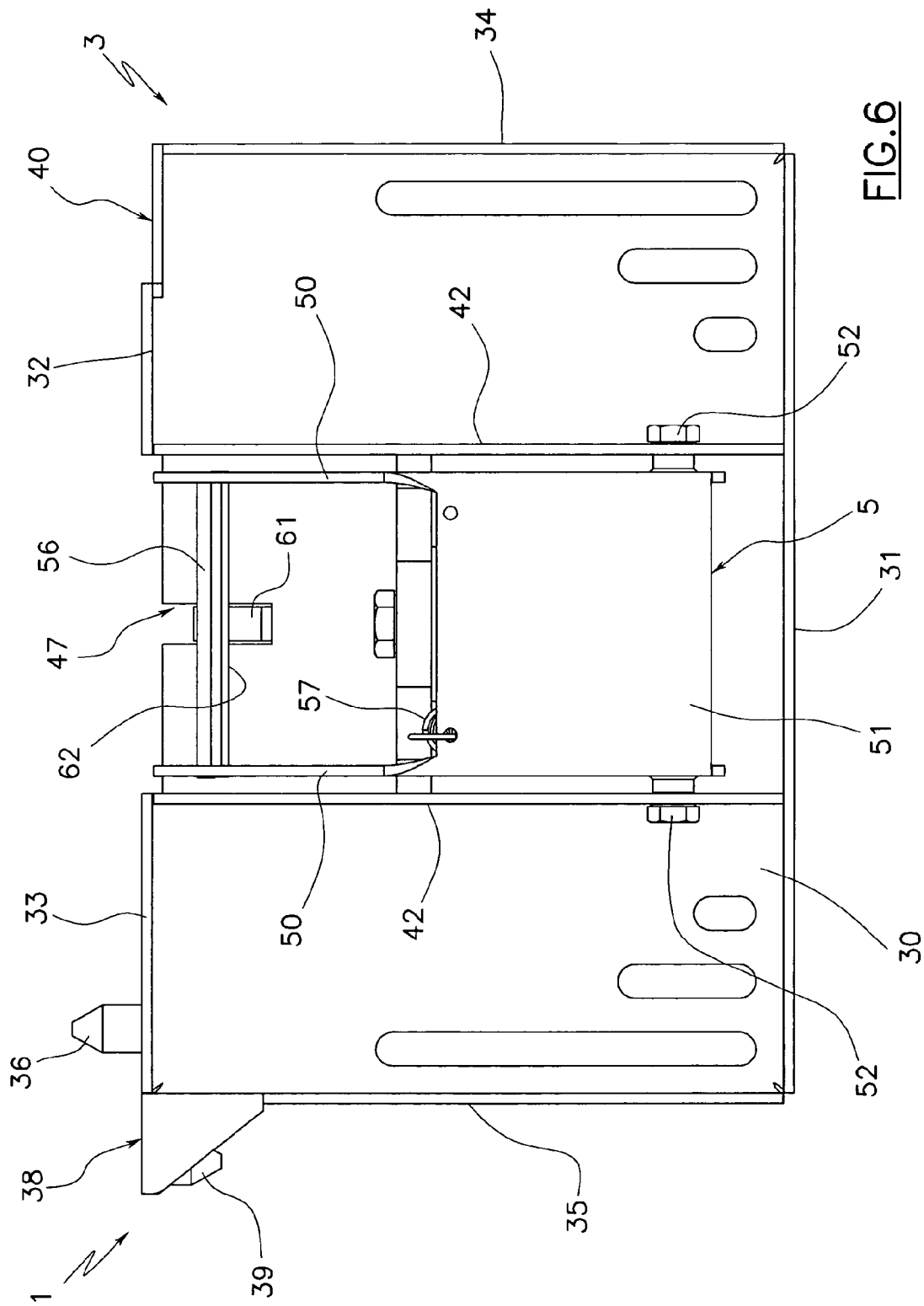
FIG. 6 is the view denoted by the arrow A in FIG. 3, shown in large-scale.

In the present description, right and left relate to the mould as seen in FIG. 6.

Figure 7:
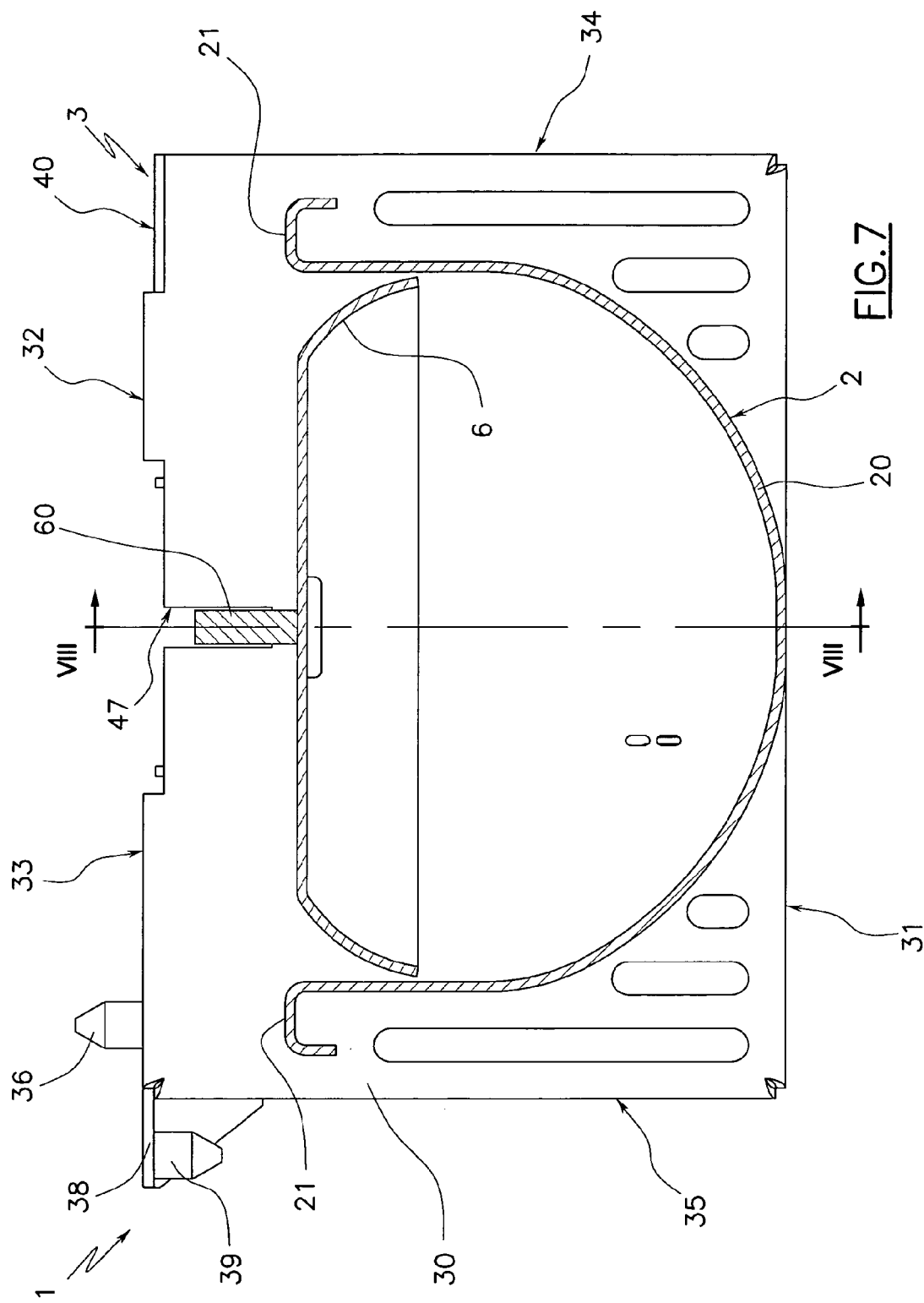
FIG. 7 is section VII-VII of FIG. 3, shown in the same scale as FIG. 6.
Figure 9:
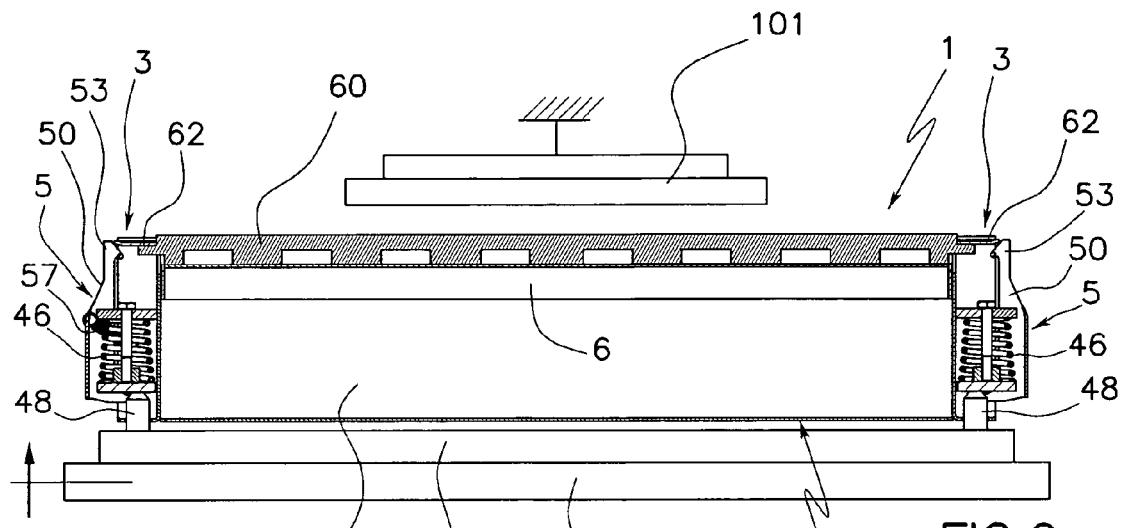
FIGS. 9, 10 and 11 are the view of FIG. 8 which show, in small scale, the bench in three stages the closing of the bottom die with the relative cover.

As illustrated in FIG. 7, the upper horizontal walls 32 and 33 are borne by the closing plate 30 at a higher level than the longitudinal edges 21 of the element 20, and the right and left vertical walls 34, 35 are borne at an appropriate distance from the longitudinal edges 21 adjacent thereto.

The lower horizontal wall 31 is borne by the closing plate 30 substantially at a level with the bottom of the element 20.

Naturally the lower horizontal wall 31, the right and left upper horizontal walls 32, 33, the right and left vertical walls 34, 35 of the forward head 3 are respectively coplanar with the lower horizontal wall 31, the right and left upper horizontal walls 32, 33, the right and left vertical walls 34, 35 of the rear head 3.

A first projecting pin 36 is fixed on the left upper horizontal wall 33 of each head 3, which pin 36 is positioned in proximity of the left vertical wall 35 and develops vertically upwards.

The lower horizontal wall 31 of each head 3, in a coaxial position with the first projecting pin 36, exhibits a first through-hole 37 with a vertical axis.

Each head 3 further comprises a shelf 38 which is coplanar with the upper horizontal wall 33 and projects with respect to the left vertical wall 35.

The shelf 38 exhibits substantially the same width as the upper horizontal wall 33 and is further fixed to the flank of the left vertical wall 35 by means of a vertical strengthening band.

A second projecting pin 39 is fixed to the shelf 38, which pin 39 develops vertically in a downwards direction and is appropriately distanced from the left lateral wall 35.

On the opposite side with respect to the shelf 38, i.e. in proximity of the right vertical wall 34, the upper horizontal wall 32 of each head 3 exhibits a flat lowered seating 40, the depth and the plan-view dimensions of which are substantially the same respectively as the thickness and the plan-view dimensions of the opposite shelf 38.

The lowered seating 40 exhibits a second vertical-axis through-hole 41, an axis of which is distanced from the right vertical wall 34 by a quantity which is about equal to the distance between the axis of the second projecting pin 39 and the left lateral wall 35.

Each head 3 further comprises two vertical flat ribs 42 which project from the closing plate 30 towards the outside, connecting the lower horizontal wall 31 with the internal ends respectively of the right upper horizontal wall 32 and the left upper horizontal wall 32.

The flat ribs 42 are arranged symmetrically with respect to a vertical plane that is parallel to the longitudinal axis X and passes through the centre of the element 20.

The flat ribs 42 stiffen the head 3, preventing the lower horizontal walls 31 and the upper horizontal walls 32 and 33 from flexing towards one another when the subjected to large weights.

Figure 2:
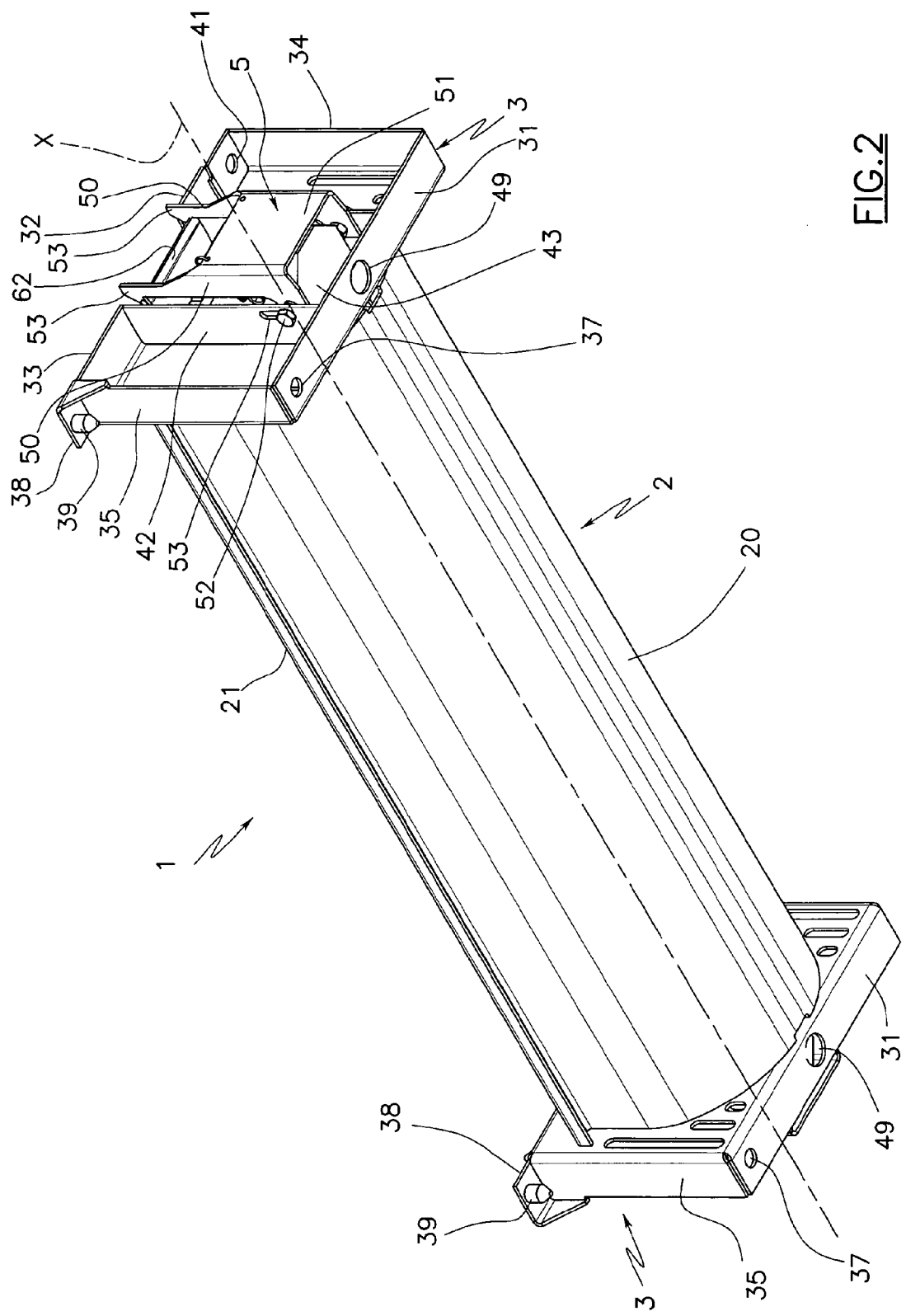
FIG. 2 is a perspective view from below in an upwards direction of the mould of FIG. 1.

As illustrated in FIGS. 2 and 8, a horizontal plate 43, defining the lower end of a hook element 5 is comprised between the flat ribs 42.

A vertical-axis guide screw 44 is screwed on the horizontal plate 43, which guide screw 44 is slidably inserted in a through-hole afforded in a horizontal shelf 45 which is projectingly fixed to the closing plate 30 and surmounts the plate 43.

A spring 46 is interposed between the projecting shelf 45 and the lower end of a hook element 5 (plate 43), in a lower down position, which spring 46 is destined to pushed the plate 43 constantly in a downwards direction, such as to maintain the spring 46 normally in the endrun position illustrated in the figures, in which the head of the guide screw 44 is in contact with the shelf 45.

Note that in this endrun position, the plate 43 is at a greater height than the lower horizontal wall 31 of the relative head 3.

From the endrun position, the plate 43 can be displaced in an upwards direction with respect to the element 20 of the bottom die 2, by means of an opposite pressure to the spring 46 action which engages the guide screw 44 to slide into the relative hole in the shelf 45.

Although it is not illustrated here, also included is the possibility that the bottom die 2 is provided with means for regulating which enable the springs 46 to be preloaded.

Finally, each head 3 comprises a hook element 5, preferably defined by an oscillating arm, which is housed substantially snugly in the space comprised between the flat ribs 42 and is connected to the plate 43.

The oscillating arm 5 comprises two shaped flanks 50, identical and positioned perfectly opposite, which are orientated parallel to the flat ribs 42 and are connected by a front strip 51.

The shaped flanks 50 and the front strip 51 are preferably obtained by cutting and subsequent bending of a single steel plate.

Each shaped flank 50 is interposed between a flat rib 42 and the plate 43 adjacent thereto, while the front strip 51 covers both the plate 43 and the spring 46.

The oscillating hook element 5 is connected to the plate 43 by means of two horizontal-axis fastening screws 52, each of which is inserted in a through-hole afforded in a respective shaped flank 50 while it is screwed into a threaded hole afforded in the body of the plate 43.

The fastening screws 52 are coaxial such as to enable the hook element 5 to rotate with respect to the plate 43 according to the common horizontal axis thereof.

As illustrated in FIGS. 1 and 2, each fastening screw 52 is further inserted in a respective slot 53 afforded in the flat rib 42 adjacent to the shaped flank 50 to which the screw is associated.

The slots 53 are perfectly opposite, have a substantially identical width to the diameter of the stalk of the fastening screws 52, and develop in a vertical direction, such as to enable the group formed by the hook element 5 and the plate 43 to move on the bottom die 2 from the above-mentioned endrun position in an upwards direction.

As illustrated in FIG. 8, starting from the fastening screws 52, the shaped flanks 50 of the hook element 5 develop vertically upwards.

The upper ends of the shaped flanks 50 are substantially conformed as a hook provided with a single tooth 53 which develops horizontally towards the closing plate 30.

The tooth 53 comprises a lower surface facing downwards, and an upper surface 55 facing upwards.

Both of the surfaces 54 and 55 are inclined in a downwards direction towards the closing plate 30, but the inclination of the upper surface 55 is much more accentuated than the inclination of the lower surface 54.

The hook teeth 53 of the shaped flanks 50 are reciprocally connected by an intermediate horizontal stiffening rod 56.

Note that when the plate 43 is in the endrun position, the hook teeth 53 of the hook elements 5 are at a lower height with respect to the upper horizontal walls 32 and 33 of the closing plate 30, such that the hook element 5 is completely contained within the vertical body of the respective head 3.

As illustrated in FIGS. 4 and 8, each hook element 5 is also connected to the relative head 3 by a recall spring 57, which exhibits a first end coupled to a through-hole afforded in the front strip 51 of the hook element 5, and the opposite end similarly coupled to the closing plate 30 of the head 3.

The recall spring 57 acts on the front strip 51 to rotate the hook element 5, in a transversal direction, towards the closing plate 30, such as to keep it normally in the operating position illustrated in FIG. 8, in which it is orientated practically vertically.

Finally, the mould 1 comprises a closing cover 6 which is separable from the bottom die 2.

The cover 6 is slightly convex, with the cavity facing downwards, and in plan view exhibits the same rectangular shape as the mouth of the concavity of the bottom die 2, with which it is aligned in order to be closed and also in order to slide vertically internally thereof, if necessary.

As illustrated in FIG. 8, the back of the cover 6 is fixed to a longitudinal support beam 60, which is parallel to the longitudinal axis X of the element 20.

The support beam 60 develops over the whole length of the cover 6 and the element 20, and terminates with two opposite end portions 61 which project from the closing plates 30 of the heads 3.

As illustrated in FIG. 6, the transversal section of the beam 60 is rather narrow, such that each of the end portions 61 is housed in a vertical guide slit 47 afforded in the space between the flat ribs 42 and the relative head 3, and which develops vertically from the upper edge in a downwards direction.

Each end portion 61 bears a horizontal plate 62, which exhibits a rectangular shape in plan view which inserts substantially snugly between the flat ribs 42 of the relative head 3.

The transversal section of the horizontal plate 62 exhibits an end tract which is slightly inclined in a downwards and outwards direction, substantially in the same way as the lower surface 54 of the hook teeth 53 of the oscillating arms 5, with the aim of making the coupling between the two parts more secure when hooked up to each other.

In use, the empty bottom die 2 is initially filled with the meat to be treated.

For example, an impermeable wrapper is placed in the bottom die 2 cavity, which cavity is then filled with meat and hermetically closed, normally under vacuum.

To realise the "weight-loss", a portion of the wrapper is left empty, exceeding the portion for containing the meat, which portion is left projecting externally by the side of the bottom die 2.

Naturally the bottom dies 2 can be used for bags already filled with meat and closed in a vacuum, for example using the dummy-mould method or using heat-welders or vacuum-bag filling machines and staplers connected thereto; also, permeable wrappers can also be used in a similar way.

After inserting the meat, the cover 6 is inserted on the bottom die 2, i.e. it is simply inserted into the mouth of the bottom die 2 by inserting the projecting tracts 61 of the upper crossbar 60 in the relative guide slits 47 of the heads 3. During this insertion, the cover 6 slides vertically for a tract internally of the bottom die 2, up to coming into contact with the meat contained therein.

When the cover 6 comes into contact with the meat, the plates 43 of the bottom die 2 has to be displaced upwards such as to cause the compression of the springs 46 and the raising of the oscillating arms 5, up to when the teeth 53 hook onto the horizontal plates 53 of the cover 6, such as to block and push it downwards in the direction of compressing the meat contained in the bottom die 2.

In the illustrated example of figures from 9 to 11, this hook is obtained by positioning the mould 1 on a support 4 which enables the horizontal plates 43 to of the bottom die 2 to be rested thereon, leaving the element 20 and the heads 3 free, such as to enable a relative vertical displacement of the oscillating arms 5 in an upwards direction.

The support 4 comprises a horizontal base from which two identical vertical pins 48 project, which insert in two vertical-axis through-holes 49 (see FIG. 2), which are afforded at the centre of the lower horizontal wall 31 respectively of the forward head 3 and the rear head, such as to be aligned with a respective plate 43.

The height of the vertical pins 48 is such that when the pins 48 are in contact with the plates 43, the lower horizontal wall 31 of the heads 3 and the bottom of the element 20 are distanced from the support base 4.

In order to maintain the bottom die 2 in equilibrium on the vertical pins 40, the support 4 can be provided with further longitudinal and transversal elements. The support 4 is then rested on the mobile lower plate 100 of a press, such as to be able to vertically raise the mould 1 towards a fixed upper plate 101. During the raising of the mould 1, each hook element 5 of the bottom die 2 is maintained by the recall spring 57 in an operating position, up to when the upper crossbar 60 of the cover 6 contacts against the upper plate 101 of the press.

Figure 10:
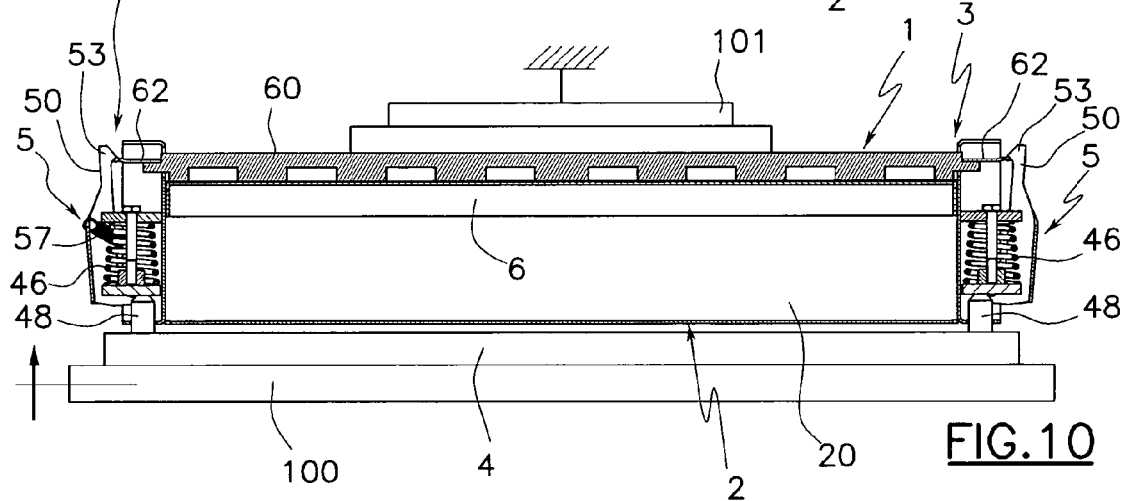
Figure 11:
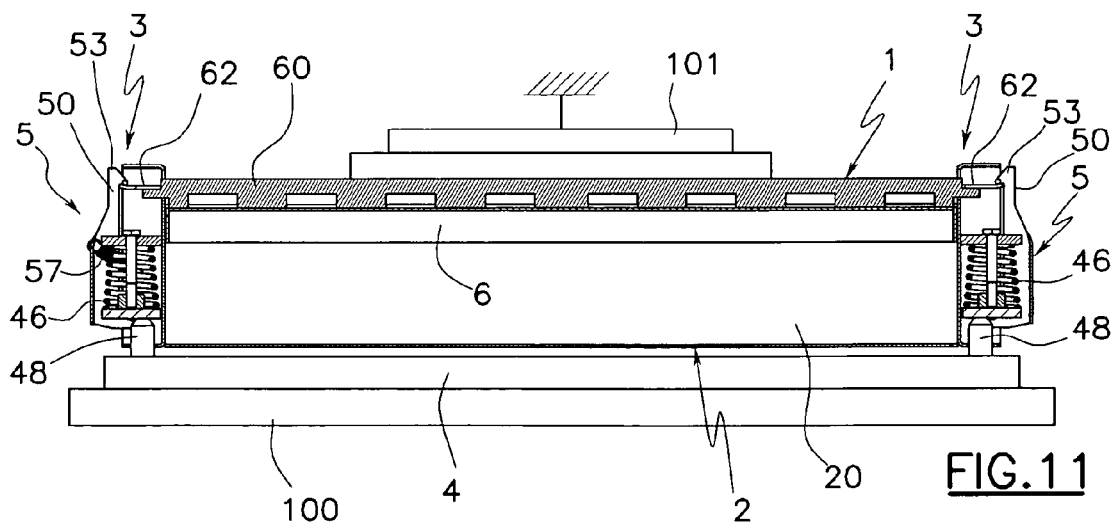
Figure 18:
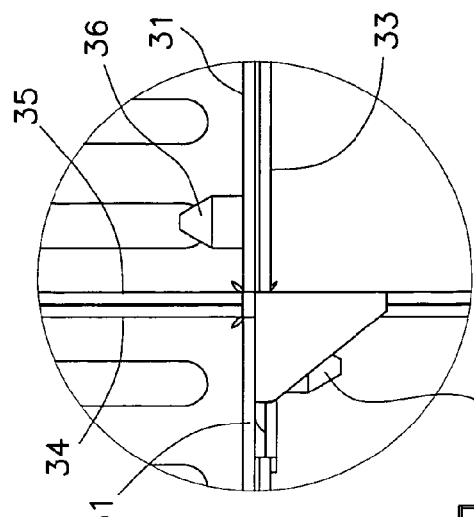
FIG. 18 is an enlarged detail of FIG. 15.

From this moment on, a further raising of the lower plate 100 causes the pins 47 of the support 4 to push the plates 43 upwards, progressively compressing the springs 46 and causing the relative raising of the oscillating arms 5; in the meantime, the end of the horizontal plates 62 of the cover 6 come into contact with the upper surface 44 of the teeth 53, which remain still, and push the oscillating arms 5 to rotate externalwise in opposition to the recall springs 57, as illustrated in FIG. 10.

In this way, when the teeth 53 pass the horizontal plates 62 of the cover 6, the oscillating arms 5 click-return into the initial operating position, pushed by the recall springs 57.

When this happens, the horizontal plates 62 are below the teeth 53, so that the cover 6 is hooked to the bottom die 2 in a vertical direction.

Naturally the hooking of both oscillating arms 5 occurs simultaneously.

The unhooking of the cover 6 during the moulding stage of the meat can be obtained with the same equipment, i.e. locating the die 1 on the support 4 between the plates of the press, which are neared, such as to compress the springs 46 and raise the teeth 53 of the oscillating arms 5 with respect to the horizontal plates 62 of the cover 6.

By keeping the teeth 53 raised, the oscillating arms 5 can be rotated in opposition to the recall springs 57, by means of a manual or automatic action, such as to free the hooking of the cover 6 before opening the press to free the mould 1.

After having been filled with the meat and closed with the relative cover 6, the moulds 1 are arranged in superposed layers on a special bench 7 for forming a stack.

As illustrated in FIG. 12, the bench 7 comprises two horizontal members 70, parallel and coplanar, which are reciprocally connected via a series of crossbars 71, and are provided with a set of feet 72 for resting on the ground. The longitudinal members 70 are reciprocally separated by a distance which is about equal to the length of the elements 20 of the single moulds 1, and are singly realised by a C-shaped beam which provides an upper horizontal wall 73.

Pins 74 are fixed on each upper wall 73, which pins 74 project vertically upwards, are aligned in a longitudinal direction and are separated by a constant step which is about the same as the width of the heads 3 of the single moulds 1.

Each pin 74 of a longitudinal member 70 is aligned in a transversal direction with a pin 74 of the opposite longitudinal member 70.

The single moulds 1 are located on the bench 7, orientated in a transversal direction with respect to the longitudinal members 70.

With reference to FIG. 13, the first mould 1 to be located on the bench 7 is the one which is most to the left.

In detail, the first mould 1 is positioned on the bench 7 by a vertical movement from above directed downwards, by means of which the lower horizontal walls 31 of the head 3 are each rested on the upper wall 73 of a respective longitudinal member 70, taking care to insert the first through-holes 37 on a respective pin 74.

The bilateral constraint between the first through-holes 37 of the heads 3 and the pins 74 of the longitudinal members 70 ensure a high transversal stability of the moulds 1 on the bench 7.

The second mould 1 is positioned on the bench 7 such as to be parallel and flanked at the same level as the first mould 1, with the left vertical walls 35 of each mould 1 rested against the right vertical walls 34 of the first mould 1.

As illustrated in FIG. 16, the contact between the vertical walls of the two moulds 1 determines the relative distance D between the respective elements 20.

The distance D is selected such as to leave a space between the elements 20 of the bottom dies 2 that is sufficiently large to facilitate circulation of the steam, the air or the hot water, during the stages of cooking the meat, and the air and/or the cold water, during the stages of cooling.

The space also enables the excess portion of the wrapper containing the meat to be housed when the cooking is done with the weight-loss method.

The positioning of the second mould 1 is also done via a vertical movement from above in a downwards direction, by which the lower horizontal walls 31 of the heads 3 are each rested on the upper wall 73 of a respective longitudinal element 70, taking care to insert the first through-holes 37 on a respective pin 74.

During this vertical movement the second pins 39 of the second mould 1 are also inserted in the second through-holes 41 of the first mould 1, such as to realise a bilateral coupling which constrains them reciprocally in a transversal direction, considerably increasing the stability thereof.

As illustrated in FIG. 17, the projecting shelves 38 of the second mould 1 rest internally of the lowered seatings 40 of the first mould 1, such that at the conclusion of the positioning the upper horizontal walls 32 and 33 of both the moulds 1 are perfectly coplanar.

The following moulds 1 are positioned on the bench 7 identically to what is described for the second mould 1, one at a time and on top of the preceding mould 1, up until a complete layer of flanked moulds 1 at a same level is achieved, as shown in FIG. 14.

In the illustrated example, the layer is formed by four moulds 1 but could naturally be formed by any other number of moulds 1.

A second layer of moulds 1 can then be formed on the first layer of moulds 1. With reference to FIG. 14, the first upper mould 1 to be positioned is the one furthest to the left.

The upper mould 1 is placed such as to be perfectly aligned in plan view with the first lower mould 1.

The upper mould 1 is then engaged in a vertical movement from above in a downwards direction, by means of which the bottom die 2 is lowered up to resting the lower horizontal walls 31 of the heads 3 in contact against the upper horizontal walls 32 and 33 of the lower mould 1, taking care to insert the first through-holes 37 of the upper mould 1 in the first pins 36 of the lower mould 1.

The bilateral constraint between the first through-holes 37 and the first pins 36 ensures correct reciprocal positions and good transversal stability of the upper mould 1 with respect to the lower mould.

As illustrated in FIG. 19, the contact between the horizontal walls 31 of the upper mould 1 and the horizontal walls 32 and 33 of the lower mould determines the relative distance E between the cover 6 and the bottom die 2 of the upper mould 1.

The distance E is chosen such as to leave a sufficiently large space to facilitate circulation of the steam, the air or the hot water, during the stages of cooking of the meat, the air and/or the cold water, during the stages of cooling.

The upper second mould 1 of the second layer is coupled entirely identically to the corresponding lower mould 1 of the first layer.

The positioning of the upper second mould 1 is also done by means of a vertical movement from above in a downwards direction, by which the lower horizontal walls 31 of the heads 3 are each rested on the upper horizontal wall 32 and 33 of the lower mould 1, taking care to insert the relative through-holes 37 on a respective first pin 36.

During this vertical movement the projecting shelves 38 of the upper second mould 1 are also rested internally of the lowered seatings 40 of the upper first mould 1, by inserting the second pins 39 internally of the second through-holes 41, such as to realise a bilateral coupling constraining the two upper moulds transversally, considerably increasing the stability.

On completing the coupling, the upper second mould 1 is parallel to and flanked at the same level as the upper mould 1.

In particular, the left vertical walls 35 of the upper second mould 1 are rested contactingly with the right vertical walls 34 of the upper first mould 1, in order to fix the relative distance D between the respective elements 20.

Figure 15:
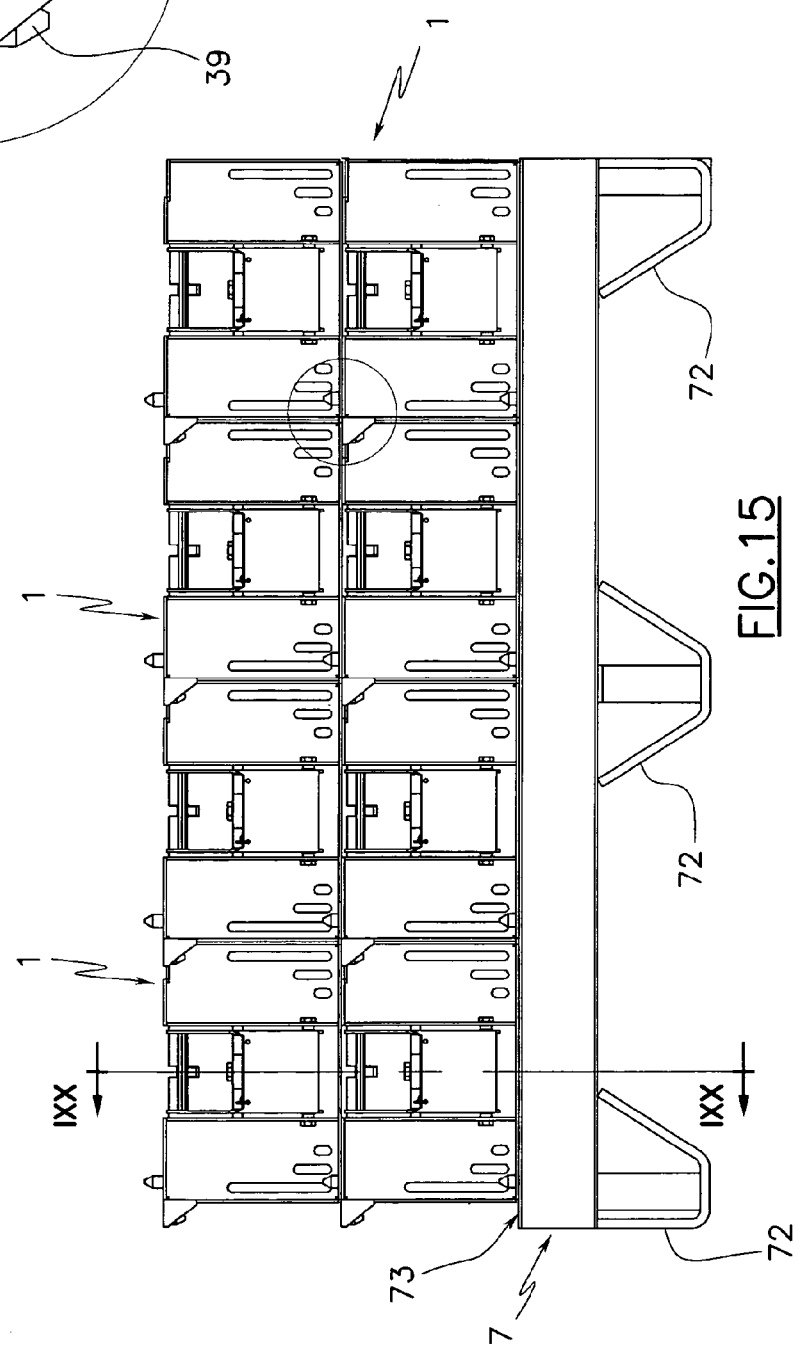

The successive upper moulds 1 are then positioned similarly, one at a time and each time resting them on the preceding mould 1, up to completing the second layer as shown in FIG. 15.

Thanks to the moulds 1 of the invention, the final stack will be very compact and stable, thanks to the coupling between the first pins 36 and the first holes 37 which ensures transversal stability between each pair of superposed moulds 1, thanks to the coupling of the second pins 39 and the second holes 41 which ensures the transversal stability between each pair of flanked moulds 1.

These characteristics also make the stack easy to move and transport, as they enable more or less automatic and relatively simple movement systems to be used.

Note that the same results could be obtained with moulds 1 having slightly different shapes.

For example, the projecting shelves 38 and the lowered seatings 40 of the heads 3 might have their positions inverted, i.e. might be located respectively at the right vertical wall 34 and the left vertical wall 35; or they might be located in the lower part of the heads 3 or on the lower horizontal walls 31, with the second pins 39 facing upwards.

In a further variant, the projecting shelves 38 could be provided with a through-hole and the lowered seatings 40 of a projecting pin could be destined to engage in the hole. In this way, the pin might also perform the function of the first pin 36, as long as the first through-hole 37 were displaced onto the opposite side of the head 3.

FIG. 20 illustrates an alternative embodiment of the invention.

This embodiment differs from the preceding embodiment only in that the upper ends of the oscillating arms 5 comprise a series of hook teeth 53 projecting towards the closing plate 30, which are located at different heights in order to enable the cover 6 to be constrained in various relative vertical positions with respect to the arms 5.

This characteristic enables the entity of the compression of the springs 46 to be varied and thus the entity of the pressure exerted by the cover 6 on the meat contained in the bottom die 2; i.e. it enables the height position of the cover 6 to be regulated in order to keep the pressure exerted on the meat constant, for example in a case in which the volume of the meat reduces during the stages of cooking. This enables a repressing operation to be performed on the meat.

This embodiment is thus particularly suited to a case in which the moulds 1 are destined to form and cook the products traditionally, i.e. not under a vacuum, while the moulds 1 having one tooth only are more suited to forming and cooking the meat in a vacuum situation.

Obviously a technical expert in the field might made technical-applicational modifications to the moulds 1 as described herein above, without forsaking the ambit of the invention as described herein below.

The invention claimed is:

1. A mould for forming meat, comprising a bottom die (2) formed as a recipient, a concavity of which faces in an upwards direction and is configured to contain the meat, a cover (6) for closing and sliding internally of the mouth of the concavity, and an elastic pusher (46) which pushes the cover (6) in order to compress the meat contained in the concavity of the bottom die (2), the elastic pusher (46) is located externally of and by a side of the bottom die (2), and is singly interposed between an opposing element (45) fixed to the bottom die (2) and a vertically-mobile hook element (5) fixed to the bottom die (2), the hook element (5) is configured to hook the cover (6) in order to create a constraint preventing the cover (6) from separating from the hook element (5) in an upwards vertical direction.

2. The mould of claim 1, wherein the hook element (5) is further mobile in a transversal direction on the bottom die (2) between an operating position in which it realised a hooking to the cover (6) and a release position in which the hooking is not operative.

3. The mould of claim 2, wherein the hook element (5) is associated to elastic biasing members (57) configured to push the hook element (5) towards the operative position thereof, and is conformed such that following a vertical movement of the hook element (5) with respect to the cover (6), which is internal of the concavity of the bottom die (2), the hook element (5) is pushed by the cover (6) towards the release position in opposition to the elastic biasing members (57), up to reaching a vertical position in which the hook element (5) click-returns into the operative position, hooking the cover (6).

4. The mould of claim 1, wherein the hook element (5) is conformed such as to hook and constrain the cover (6) in various vertical positions thereof with respect to the hook element (5).

5. The mould of claim 1, wherein the hook element comprises an arm (5) which is hinged at a horizontal axis thereof to an intermediate element (43) which is coupled to the bottom die (2) such as to be able to move in a vertical direction, the arm (5) developing upwards and terminating in one or more hook elements for hooking the cover (6).

6. The mould of claim 1, wherein the bottom die (2) comprises right lateral strike surfaces (34) and left lateral strike surfaces (35) configured to come into striking contact with the right lateral strike surfaces (34) of the bottom die (2) of an identical mould (1) flanking the mould (1) at a same level thereas, in order to establish a minimum horizontal distance (D) therebetween.

7. The mould of claim 1, wherein the bottom die (2) comprises upper strike walls (32, 33) and lower strike walls (31), the lower strike walls (31) configured to rest on the upper strike walls (32, 33) of an identical mould positioned below the mould, in order to establish a minimum vertical distance (E) there-between, the vertical distance (E) being such as to leave, between the bottom dies (2), a free space which is sufficient to contain the cover (6) of the lower mould (I), without the lower mould (1) coming into contact with parts of the upper mould (1).

8. The mould of claim 1, wherein the bottom die (2) comprises constraining elements (36, 37) configured to cooperate with the constraining elements (36, 37) of the bottom die (2) of an identical further mould (1) positioned below the mould (1) when strike surfaces of the upper bottom die (2) are resting on the upper strike surfaces (32, 33) of the lower bottom die (2), in order to define a bilateral constraint in a transversal direction between the two stacked bottom dies (2).

9. The mould of claim 8, wherein the constraining elements comprise at least two vertically-developing engaging elements (36) and at least two vertical-axis holes (37) said holes (37) are configured respectively to receive engaging elements (36) of the bottom die (2) of an identical mould (1) stacked on the mould (1).

10. The mould of claim 1, wherein the bottom die (2) comprises further constraining elements (39, 41) configured to cooperate with the further constraining elements (39, 41) of the bottom die (2) of an identical mould (1) flanked at a same level as the mould (1), in order to define a bilateral constraint in a transversal direction between the flanked bottom dies (2).

11. The mould of claim 10, wherein the further constraining elements comprise at least two vertically-developing further engaging elements (39), and at least two further vertical-axis holes (41), which are configured respectively to receive the further engaging elements (39) of the bottom die (2) of an identical mould (1) flanked at a same level as the mould (1).

12. The mould of claim 1, wherein the bottom die (2) comprises two heads (3) positioned at opposite ends of the concavity, each of which comprises a rectangular closing plate (30) arranged vertically in order to close a respective end of the concavity, the closing plate (30) being provided with a vertical slit (47) for slidably receiving a projecting element (61) of the cover (6) which bears a body (62) configured to be hooked by the hook element (5).

13. The mould of claim 12, wherein horizontal walls (31, 32, 33) project from lower and upper edges of the closing plate (30), said horizontal walls (31, 32, 33) respectively define the lower and upper strike surfaces of the bottom die (2), and vertical walls (34, 35) project from lateral edges of the closing plate (30), which vertical walls (34, 35) are configured respectively to define the right lateral and left lateral strike surfaces of the bottom die (2).

14. The mould of claim 12, wherein the heads (3) comprise a horizontal shelf (38) projecting transversally from a first of the vertical walls (35) and being coplanar to a first of the horizontal walls (31, 32, 33), and a lowered seating (40) afforded at the second vertical wall (34) to restingly receive a projecting shelf (38) of the bottom die (2) of a mould (1) which is identical to and flanks the mould (1), further vertical-axis holes (41) and further vertical-axis engaging elements (39) being respectively associated with the lowered seatings (40) and the projecting shelves (38) or vice versa.

* * * * *